June 20, 1967  E. J. SCHAEFER  3,326,612
THRUST BEARING ASSEMBLY
Filed June 9, 1964  3 Sheets-Sheet 2
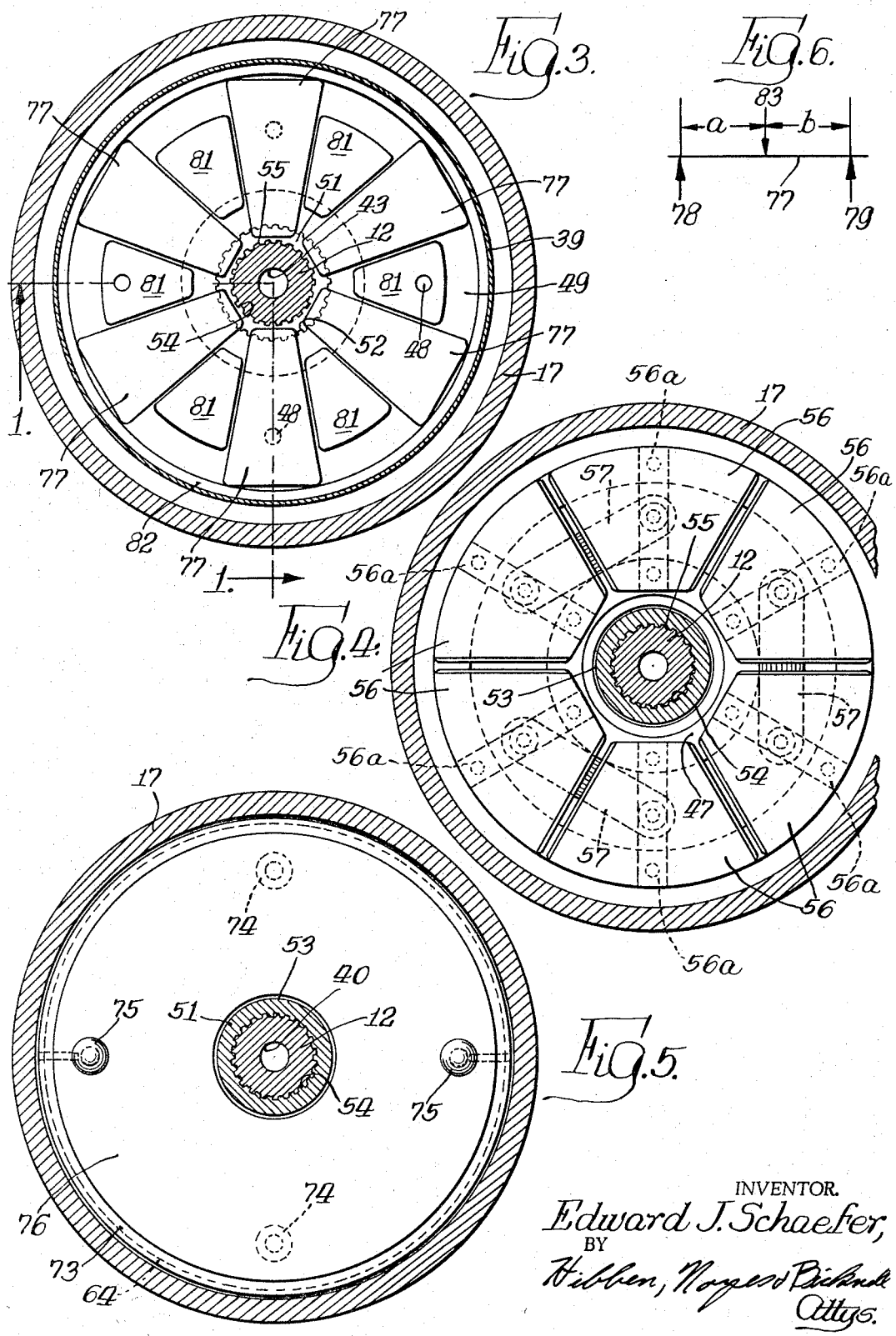
INVENTOR.
Edward J. Schaefer,
BY
Hibben, Noyes Bicknell
Attys.

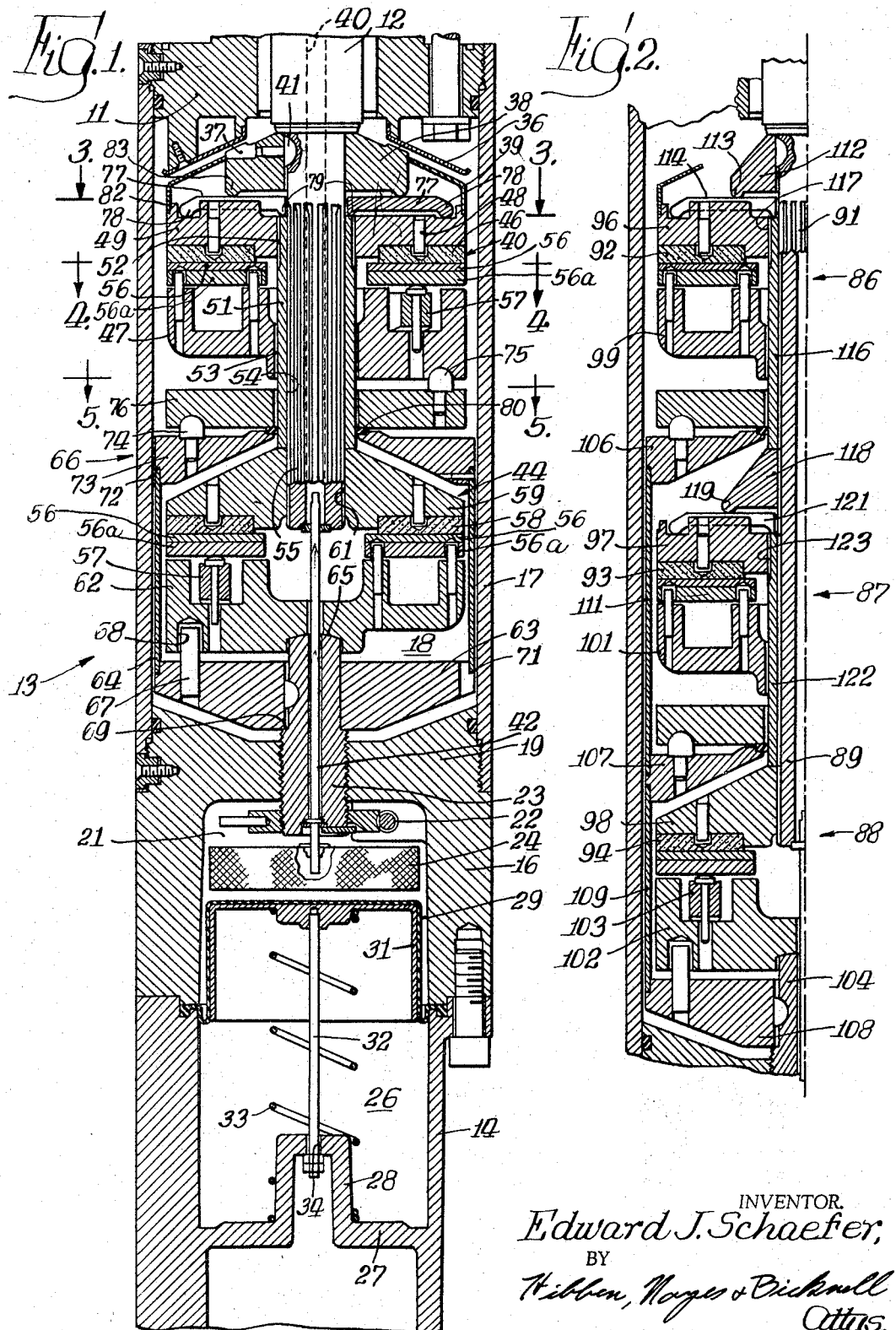

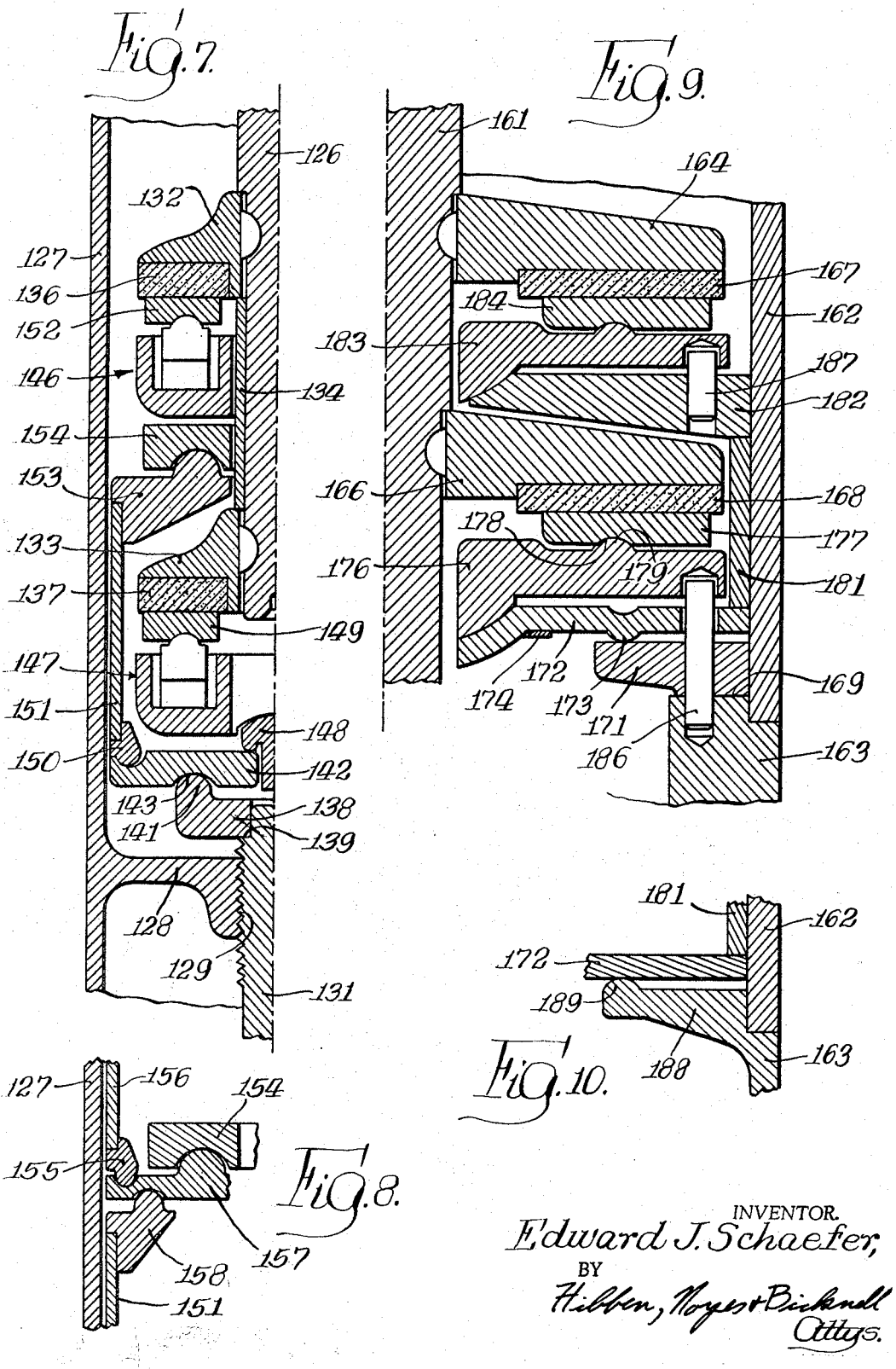

United States Patent Office 3,326,612
Patented June 20, 1967

3,326,612
THRUST BEARING ASSEMBLY
Edward J. Schaefer, Bluffton, Ind., assignor to Franklin Electric Company, Inc., Bluffton, Ind., a corporation of Indiana
Filed June 9, 1964, Ser. No. 373,774
22 Claims. (Cl. 308—160)

The present invention relates to thrust bearings and more particularly to a thrust bearing assembly for use with a submersible electric motor and the like.

Submersible electric motor-pump units that may be inserted in a pipe or well casing have become favored for use in deep wells. As their use has increased, so has the demand for larger motor-pump units and for units capable of developing very high pressure. Naturally, as the size of such motor pump units increases, the magnitude of the thrust loads imposed on the motor-pump unit also increases. Accordingly, it has been necessary to increase the capacity of the thrust bearings used in connection with such units.

It has been found that the power of submersible motors and the capacity of pumps used in such units can be increased many times while keeping the outer diameter thereof sufficiently small to fit inside standard pipes or casings. In fact, such increases have outrun the thrust capacity of conventional thrust bearings that can be fitted into units of such limited diameter. While this is true of bearings of both oil and water lubricated types, it is particularly true for the water lubricated type.

It is a primary object of the present invention to provide a novel thrust bearing assembly of relatively large thrust capacity.

Another object is to provide a thrust bearing assembly of relatively small diameter but having large thrust capacity.

Still another object is to provide a thrust bearing assembly comprising a plurality of stacked bearing units in which the thrust load is divided among the units.

Yet another object is to provide a novel thrust bearing assembly for large capacity submersible motor-pump units of relatively small diameter.

Other objects and advantages of the invention will be apparent from the following description taken in conjunction with the accompanying drawings, wherein:

FIG. 1 is a longitudinal sectional view of part of a submersible motor, taken on the line 1—1 in FIG. 3 and showing one form of a thrust bearing assembly embodying the present invention;

FIG. 2 is a view similar to FIG. 1, showing another form of bearing assembly embodying the present invention;

FIG. 3 is a cross sectional view, on a larger scale, taken along line 3—3 in FIG. 1;

FIG. 4 is another similar cross sectional view taken along line 4—4 in FIG. 1;

FIG. 5 is still another cross sectional view taken along line 5—5 in FIG. 1;

FIG. 6 is a force diagram for one part of the assembly shown in FIG. 1;

FIG. 7 is a view generally similar to FIG. 1, showing another form of bearing assembly embodying the invention;

FIG. 8 is a view showing a portion of still another form of bearing assembly embodying the invention and similar to the form shown in FIG. 7;

FIG. 9 is a view similar to FIG. 7 and showing still another form of bearing assembly embodying the invention; and FIG. 10 shows an alternative construction of a portion of the assembly shown in FIG. 9.

The objects of the present invention are accomplished by providing a thrust bearing assembly adapted to be used with a rotatable thrust imposing member and a non-rotatable support member. The assembly comprises a plurality of thrust bearing units, each unit being virtually a complete thrust bearing and each including a rotatable element and a non-rotatable element. The rotatable element of each unit is adapted to be connected to the rotatable member, and the non-rotatable element of each unit is adapted to be connected to the non-rotatable members. The assembly further includes means for dividing and distributing the thrust from the thrust imposing member among the units, the dividing and distributing means being interposed between one of the elements of each unit and the member to which these elements are connected.

The thrust imposing member is usually a rotatable shaft and the support member is usually a portion of a stationary housing for the bearing assembly. The dividing and distributing means may be connected to either the rotatable or the non-rotatable elements of the units.

FIG. 1 illustrates the structure of the lower end of an electric motor-pump unit of the submersible type, which is a typical environment for a bearing assembly embodying the present invention. Since neither the pump nor the upper part of the motor are necessary for an understanding of the present invention, they are not illustrated herein. In this instance the motor is lubricated by the liquid in which it is submerged and has the usual stator (not shown) and rotor (not shown) which are enclosed by a cylindrical casing structure (not shown) and end bells at the opposite ends of the motor. A portion of the lower end bell is shown at 11 in FIG. 1. The end bell 11 provides radial bearing support for one end of the motor's rotor shaft. A portion of the shaft, indicated at 12, projects downwardly through the end bell 11 and into an end assembly, indicated generally at 13, containing pressure equalizer structure, gear means for axially positioning the rotor shaft 12, means for circulating the liquid through the motor, and a thrust bearing assembly embodying the present invention.

The lower end assembly 13 includes housing means comprising a diaphragm housing 14, located at the lower end of the assembly, a gear housing 16, and an outer tube or casing 17, connected together in end-to-end relation, as shown, to form an elongated cylindrical housing structure. The maximum outer diameter of the assembly 13 is substantially equal to the outer diameter of its associated motor.

The casing 17 has an internal chamber 18 for containing a thrust bearing assembly embodying the present invention. The upper end of the thrust bearing chamber 18 terminates at the end bell 11 and the lower end of the thrust bearing chamber 18 terminates at the upper end portion 19 of the gear housing 16. The gear housing 16 is provided with a central cavity 21 which cavity contains means for adjusting the axial position of an adjusting screw 23. In this instance the adjusting means is a worm and gear mechanism 22. Adjusting the axial position of the screw 23 also adjusts the axial position of portions of the thrust bearing assembly hereinafter to be described and the rotor shaft 12 supported by the thrust bearing assembly. The cavity 21 also contains a screen assembly 24 for preventing particles of foreign matter from circulating with the lubricant through the system.

The diaphragm housing 14 has a cavity 26 that faces the cavity 21. A wall portion 27 extends across the lower end of the cavity 26 and provides a spring locating projection 28. When the gear housing 16 and the diaphragm housing 14 are assembled as shown, the cavities 21 and 26 are separated by a pressure equalizing diaphragm 29 of resilient material, such as rubber, supported by a cup-shaped piston member 31 mounted on a retaining rod 32.

A spring 33, having one end seated around the projection 28 and its other end seated against the piston member 31, tends to force the piston member 31 away from the wall 27. The rod 32 extends through an opening 34 in the projection 28 and a considerable amount of clearance is provided around the rod 32 to permit ambient fluid to enter the cavity 26 to act on the lower face of the diaphragm 29. The upper face of the diaphragm 29 is exposed to lubricating liquid inside the motor, which enters the cavity 21 through openings (not shown) in the portion 19 and through the chamber 18. Thus, the diaphragm 29 and its associated structure act to equalize pressure inside the motor with that outside the motor.

In reaching the cavity 21, the lubricating liquid from the motor enters the upper end of the chamber 18 through openings around the shaft 12. The liquid is then pumped through the chamber 18 by pump structure located near the top of the structure as shown in FIG. 1. The pump structure comprises a pump chamber formed by a fixed sheet metal baffle 36 secured to the end bell 11 as shown, impeller structure 37 formed on the top surface of a thrust plate 28, to be described more fully hereinafter, and a rotatable sheet metal baffle 39 covering the top of the thrust bearing assembly. The thrust plate 38 is secured to the shaft 12, as by a Woodruff key 41 and thus rotates in unison with the shaft 12 to drive the impeller structure 37. The impeller structure 37 thus circulates or pumps liquid from the motor down between the baffles 36 and 39 and down through the chamber 18 into the cavity 21. From the cavity 21 the liquid is pumped through the screen assembly 24 into a return tube 42 which connects to a bore 40 in the shaft 12. The bore 40, of course, carries the liquid up into the rotor chamber (not shown). The liquid from the motor passes around and through the thrust bearing assembly and acts as a lubricant therefor.

The thrust bearing assembly shown in FIG. 1 is a vertical assembly having an upper bearing unit, indicated generally at 43, and a lower bearing unit, indicated generally at 44. The two bearing units 43 and 44 are of substantially equal size and capacity and the thrust load is preferably distributed equally between them, as hereinafter explained. The bearing units 43 and 44 are each of the Kingsbury or pivoted segment type. However, it will be recognized by those skilled in the art that other types of thrust bearing units, such as ball bearing units, could be used.

The upper bearing unit 43 comprises a rotatable element, in this instance, a graphite disk 46, and a non-rotatable element comprising a leveling disk 47, both of said elements being generally flat and annular. The graphite disk 46 is secured, as by pins 48, to the under surface of a bearing support disk 49 for rotation therewith. The bearing support disk 49 is rotatably driven by the shaft 12, which may be considered a rotatable thrust imposing member, but, for the reasons which will be apparent hereinafter, the bearing support disk 49 is axially shiftable with respect to the shaft 12. To this end, the disk 49 has a splined connection to the upper end of a sleeve 51. The sleeve 51 has an externally splined portion 52 at its upper end but has an externally unsplined portion 53 at its lower end. The sleeve 51 also has internal splines 54 extending throughout its length (see FIGS. 3, 4 and 5). The internal splines 54 on the sleeve 51 are engaged with splines 55 formed on the lower end of the shaft 12, as shown in FIGS. 1, 3, 4 and 5. Thus the sleeve 51 rotates with the shaft 12 but is free to axially shift on the shaft 12. Likewise, the disk 49 rotates with the seleve 51, but is also free to shift axially to some extent with respect thereto.

The leveling disk 47 in the upper unit 43 is held against rotation, as later explained, relative to the outer casing 17 and supports a plurality of thrust pads or segments 56 having bars 56a secure do their lower sides which segments are tiltably supported on conventional rocker arm and pin assemblies 57. As is shown in FIG. 4, in the present instance there are six bearing segments 56 supported upon three rocker arm and pin assemblies 57. The bearing segments 56, of course, engage the lower surface of the bearing disk 46 in the usual manner.

The lower bearing unit 44 is much like the upper bearing unit 43, described above, in that it has a bearing disk 58 pinned to a thrust plate 59. The thrust plate 59, however, in this instance, has internal splines 61 which directly engage the splined portion 55 of shaft 12, the splined portion of the shaft projecting below the lower end of the sleeve 51 for this purpose. The lower bearing unit 44 also has a non-rotatable leveling disk 62 which is provided with six thrust segments 56 tiltably supported on three rocker arm and pin assemblies 57, the segments 56 engaging the bearing disk 58 as shown.

A bearing assembly according to the present invention also includes means for supporting the bearing units and holding them in assembled operative relation. This means may be considered a non-rotating support member. As shown in FIG. 1, the supporting means comprises the adjusting screw 23 and a thrust support assembly comprising a member 63, a support sleeve or tube 64, and a support disk assembly indicated generally at 66. The support sleeve 64 and the shiftable sleeve 51 are concentric outer and inner sleeves. The member 63 is keyed to the screw 23, as shown.

The lower bearing unit 44 is supported directly on the upper end of the adjusting screw 23, which upper end is convex, as shown at 65, for engagement in a centrally located concave socket formed in the bottom of the leveling dish 62. Thus, the leveling disk 62 can universally tilt on the adjusting screw 23 for leveling its thrust segments 56, and the thrust load imposed on the unit will be transmitted through the screw 23 to the gear housing 16. The leveling disk 62 is held against rotation relative to the member 63 by a pin 67 mounted in the member 63 and loosely projecting into a bore 68 formed in the disk 62. The member 63 is, in turn, rigidly keyed to the screw 23 which is held against rotation by the worm and gear mechanism 22.

The upper bearing unit 43 is also supported by the adjusting screw 23, but the thrust support assembly, mentioned above, is used to support the bearing unit 43 is spaced relation above the unit 44. Thus, the member 63 is seated on a shoulder 69 formed on the screw 23, and the lower end of the support tube 64 is seated on a shoulder 71 formed on the member 63, to which the tube is fastened. The upper end of the tube 64 bears against and is fastened to a shoulder 72 formed on a thrust support disk 73 of the assembly 66. The support disk 73 has a central opening, as shown, providing clearance around the shaft 12 and the sleeve 51.

The upper bearing unit is also universally tiltable, in order to equalize the bearing load among its segments 56. To this end, gimbals structure is provided, comprising two pairs of diametrically located pivots. One pair of pivots, one of which is shown at 74 is FIG. 1, is secured to the support disk 73 and seated in corresponding spherical depressions formed in the under surface of a leveling plate 76, as shown. The leveling plate 76 has the other pair of diametrically located pivots, one of which is shown at 75 in FIG. 1, secured thereto and seated in corresponding spherical depressions formed in the bottom of the leveling disk 47. The pivots 74 are on a diameter that is perpendicular to that of the pivots 75 (see FIG. 5) thereby providing a universal tilting action for the disk 47. The plate 76 also has a central opening providing clearance around the shaft 12 and the sleeve 51. A rubber ring 80 is disposed between the disks 73 and 76 at their inner periphery, as shown. The pivots 74 and 75, seated as they are in their associated spherical depressions, hold the leveling disk against rotation relative to the housing structure. Thus, it will be seen that the non-rotatable element of each of the thrust bearing units is supported by self-leveling means.

A bearing assembly according to the present invention also includes balancing means for dividing the thrust load into portions of predetermined relationship and distributing proportional parts of the load among the bearing units. The dividing and distributing means of the bearing assembly may be interposed between either the rotating or the non-rotating elements of the bearing units and the member to which that element is connected. In the forms shown in FIGS. 1 and 2, the dividing and distributing means is interposed between the rotating elements of the assembly and the thrust imposing member, or shaft 12. In FIG. 1, a set of six radially extending levers 77 (see FIG. 3), in cooperation with the thrust plate 38, the bearing support 49, and the sleeve 51, divides the thrust load equally into two portions and distributes the portions of the load to the respective bearing units.

As shown in FIG. 3, the levers 77 are tapered so that their inner ends are narrower than their outer ends. The levers 77 are circumferentially arranged and project radially with respect to the shaft 12. Each lever 77 has a downwardly extending projection 78 on its outer end and a similar downwardly extending projection 79 on its inner end (see FIG. 1). The projections 78 bear against the bearing support 49 and the projections 79 bear against the upper end of the axially shiftable sleeve 51. The levers 77 are held in spaced relation by circumferentially spaced tapered portions 81 formed on the top side of the bearing support 49 (see FIG. 3). Of course, the levers 77 rotate at a high rate of speed with the bearing support 49 and hence tend to move radially outwardly. They are prevented from doing so by an upstanding flange 82 formed on the top of the bearing support 49, which is engaged by the outer ends of the levers 77 as shown in FIG. 3. The thrust plate 38, previously described as being keyed to the shaft 12, transmits substantially all of the thrust load from the shaft 12 to the set of levers 77. the thrust plate 38 has a downwardly extending circular projection 83 in the form of an annular flange at the outer periphery of the thrust plate 38, which bears against the set of levers 77, as shown.

The location of the projection 83 on the thrust plate 38 relative to the end projections 78 and 79 on the levers 77 determines precisely how the thrust load will be divided among the bearing units by the levers 77. Thus, when the projection 83 is located midway between the projections 78 and 79, the load will be equally divided between the projections. When it is desired to have one set of projections transmit a greater share of the thrust load, this effect can be accomplished by locating the projection 83 nearer to the one set of projections than the other. This, in effect, varies the ratio of lever arms $a$ and $b$, shown in FIG. 6. If, for example, it is desired that the upper unit 43 carry a greater share of the thrust load, the projection 83 is located nearer the projections 78. On the other hand, if it is desired that the lower unit 44 carry a greater share of the thrust load, the projection is located nearer the projections 79.

In the present form, the projection 83 is located radially midway between the projections 78 and 79 on the levers 77 (see FIG. 6). A conventional force and moments analysis will show that, with this arrangement, half of any thrust load is transmitted by the levers 77, through the end projections 78, to the upper thrust bearing unit 43. The other half of such thrust load is transmitted, through their inner end projections 79 and the sleeve 51, to the lower bearing unit 44. Hence, each bearing unit carries an equal share of the thrust load.

Using the same principles, it is feasible to assemble more than two bearing units if more thrust capacity is required. Thus, FIG. 2 shows a bearing assembly in which there are three stacked bearing units indicated generally at 86, 87 and 88, respectively. The three units cooperate with a rotatable motor shaft 89 which has splines 91 that extend from the bearing unit 86 to the lower end of the shaft, the shaft 89 also being considered a thrust imposing member. The bearing units 86 and 87 are substantially identical to the bearing units 43 described above, and the bearing unit 88 is substantially identical to the unit 44, described above.

The bearing units 86, 87 and 88 include rotatable elements comprising graphite disks 92, 93 and 94 respectively. The disks 92, 93 and 94 are connected by pins to support disks 96, 97 and 98 respectively. As in the preceding form, the disks 96, 97 and 98 rotate with the shaft 89 but are free to shift axially of the shaft. The bearing units also include non-rotatable elements comprising leveling disks 99, 101 and 102 respectively, which are held against rotation relative to the motor casing and which support a plurality of thrust segments on rocker arm assemblies such as were previously described. One such segment and rocker arm assembly is identified at 103 in unit 88.

The three bearing units 86, 87 and 88 are held in assembled relation by supporting means, which again may be considered a non-rotating support member, comprising an adjusting screw 104 and a thrust support assembly including spacer tubes. Thus, the leveling disk 102 of the lower-most most unit 88 is seated at its center directly on the upper end of the screw 104. The leveling disks 99 and 101 are supported on gimbals structures comprising support disk assemblies 106 and 107 respectively, for universal tilting. The support disk assemblies 106 and 107 are supported, in spaced relation, above the screw 104 by a support member 108, which is keyed to the screw 104, and a pair of spacer tubes 109 and 111. The lower end of the tube 109 bears against and is fastened to the member 108 and the support disk assembly 107 is seated on and fastened to the upper end. The tube 111 has its lower end bearing against and fastened to the disk assembly 107 and the support disk assembly 106 is seated on and fastened to the upper end.

The present load dividing and distributing means is structurally similar to that previously described, but provides for the third bearing unit. Thus, the thrust load is received from the shaft 89 by a thrust plate 112, which is keyed to the shaft as shown. The thrust plate 112 transmits the load through a projection 113 to a set of circumferentially arranged levers 114 similar to the levers 77. The levers 114 transmit, through their outer ends, one-third of the load to the support disk 96 and transmit two-thirds of the load, through their inner ends, to the upper end of an axially shiftable sleeve 116. The division of the load is accomplished by precisely locating the projection 113 so that it engages the levers at a position one-third of the distance between the projections on the levers, measured from the inner projection.

The sleeve 116 is internally splined, to engage the splines 91 on the shaft 89. The sleeve 116 is thus rotatively fixed but axially shiftable with respect to the shaft, for transmitting two-thirds portion of the thrust load to lower parts of the assembly. The sleeve 116 also has external splines 117 at its upper end in engagement with mating splines on the support disk 96, to permit relative axial shifting therebetween.

The lower end of the sleeve 116 bears against a second thrust plate 118 and transmits the two-thirds portion of the thrust load thereto. The thrust plate 118, unlike he thrust plate 112, is axially shiftable relative to the shaft 89, and therefore it is internally splined. The thrust plate 118, in turn, transmits, through a projection 119, the two-thirds portion of the thrust load to a second set of levers 121. In this instance the set of levers 121 is identical to the set of levers 114.

The set of levers 121 and the thrust plate 118 cooperate to divide the remainder of the thrust load into equal portions (each portion being equal to one-third of the total thrust load). To effect this division, the projection 119 on the thrust plate 118 engages the set of levers 121 precisely midway between the end projections on the levers, as shown in FIG. 2 of the drawing.

The set of levers 121, in cooperation with a second splined sleeve 122, transmits the remaining equal portions of the thrust load to the units 87 and 88. Thus, the outer ends of the levers 121 bear against the support disk 97 and directly transmit one-third of the original load thereto. The inner ends of the levers 121 bear against the upper end of the sleeve 122.

The sleeve 122 is internally splined for cooperation with the splines 91 on the shaft in the same manner as the sleeve 116. Also, the sleeve 122 has external splines 123 which engage mating splines on the support disk 97, as shown. The lower end of the sleeve 122 bears against the support disk 98 and, hence, transmits the remaining one-third portion of the thrust load to the lowest bearing unit 88.

Thus, in the form of the invention illustrated in FIG. 1 the thrust load is divided into two equal portions transmitted to and absorbed by two bearing units, and in the form of the invention illustrated in FIG. 2, the thrust load is divided into three equal portions and the portions are respectively transmitted to and absorbed by the three bearings units. It is apparent that even more bearing units could be assembled together to provide whatever additional thrust capacity is needed. Each additional unit requires an additional support structure, an additional set of levers, an additional sleeve for transmitting part of the load to following units, and a thrust plate. The lever arm ratios for the respective bearing units determine the distribution of the load between the units. Mathematically, it can be shown that the lever arm ratios ($a/b$ in FIG. 6) for load equalization in an assembly having N units are whole numbers. And the first of the ratios is equal to $(N-1)$ to 1, the next is equal to $(N-2)$, and so on until the last of which is 1 to 1. There is no real lever arm ratio for the last unit (it would be 0 to 1), hence, no levers are provided for it.

In the forms of the invention described above, the thrust dividing and distributing means is interposed between the rotating element of each bearing unit and a rotatable shaft, or thrust imposing member. In the forms of the invention shown in FIGS. 7 to 10, the thrust dividing and distributing means is interposed between the stationary element of each bearing unit and non-rotating support member.

In FIG. 7, the numeral 126 indicates the lower end of a rotatable shaft and the numeral 127 indicates a non-rotating cylindrical casing or support which is concentric with the shaft 126. The casing 127 includes an inwardly extending portion 128 having an internally threaded hole 129 formed therethrough below the lower end of the shaft 126. The hole 129 is coaxial with the shaft 126 and receives an adjusting screw 131 which is generally similar to the screw 23 shown in FIG. 1.

The bearing assembly comprises upper and lower supports discs 132 and 133, respectively, which are axially spaced along the shaft 126 and are keyed thereto. Thus, the discs 132 and 133 are axially and rotatively stationary relative to the shaft 126. A sleeve 134 may be positioned on the shaft 126 and engage the adjacent edges of the discs 132 and 133. The support discs 132 and 133 support graphite discs 136 and 137 respectively, which also rotate with the shaft 126.

The bearing assembly further comprises a support ring 138 which is seated on a shoulder 139 formed adjacent the upper end of the adjusting screw 131, and is supported thereby. At the outer periphery of the ring 138 is formed a flange portion 141 which extends upwardly toward the shaft 126, the portion 141 having a rounded upper surface. The ring 138 supports a dividing and distributing means comprising a plurality of radially extending levers 142 which may be generally similar to the levers 77 shown in FIGS. 1 and 3. Each lever 142 has a rounded arcuate groove 143 formed in the underside thereof, the grooves being seated on the flange portion 141. The levers 142 support upper and lower stationary support disc assemblies 146 and 147, respectively. As in the construction shown in FIG. 1, to distribute the load equally to the two assemblies, the grooves 143 are formed substantially midway between the inner and outer edges of the levers 142. At their inner edges, the levers 142 support a member 148 which is coaxial with the shaft 126 and has a rounded upper surface. The lower support disc assembly 147 is seated on the upper surface of the member 148 and includes a plurality of bearing segments 149 which slidingly engage the graphite disc 137. At their outer edges the levers 142 support a stationary support sleeve 151 which rests on a ring 150 having a rounded lower edge seated in grooves in the levers 142. The sleeve 151 extends upwardly closely adjacent the casing 127 and supports the upper support disc assembly 146, which also includes a plurality of segments 152, a support disc 153 and a leveling disc 154. The segments 149 and 152 may be similar to the segments 56 shown in FIGS. 1 and 4 and are similarly supported for universal tilting movement.

Thus, the thrust dividing and distributing means including the levers 142 and the sleeve 151 are stationary with the casing 127. Since two bearing units are included in the form shown in FIG. 7, the levers 142 are supported midway between their ends and only one sleeve is required. If, for example, three bearing units were provided, the grooves 143 would be formed one-third of the distance between the member 148 and the sleeve 151. In the latter construction, a second sleeve 156 (FIG. 8) is required, and the leveling disc 154 rests on a support disc 157 which must be extended outwardly as shown in FIG. 8 sufficiently far to act as a lever and support the sleeve 156. A ring 155 is interposed between the sleeve 156 and the support disc 157, and a ring 158 is interposed between the sleeve 151 and the support disc 157. Of course, the location of the point of support between the members 158 and 157 must also be adjusted to distribute the load between the sleeve 156 and the assembly 146.

In FIG. 9, the support for the stationary parts is provided adjacent the outer casing rather than from adjacent the axis of the apparatus as in FIG. 7. This apparatus includes a rotatable shaft 161, a casing 162 substantially concentric with the shaft 161, and a support 163 for the casing 162. Two bearing units are again shown, these units including upper and lower support discs 164 and 166 which are keyed to the shaft 161 for rotation therewith. The discs 164 and 166 support graphite discs 167 and 168, respectively.

The support 163 has an inwardly extending ledge 169 formed thereon which supports a main support ring 171. A plurality of radially extending, circumferentially spaced levers 172 are supported on the ring 171, each lever 172 including a downwardly extending rounded projection 173 which rests on the ring 171. As shown in FIG. 9, the projections 173 are located substantially midway between the inner and outer edges of the levers 172. A thin, flexible metal washer 174 is preferably necured as by welding to each of the levers 172 to hold them in assembled relation during assembly of the bearing.

Adjacent their inner edges, the levers 172 support a disc 176 which in turn supports a plurality of segments 177. Each segment 177 has a rounded recess 178 formed in its underside which receives a rounded projection 179 on the disc 176, which arrangement permits universal tilting movement of the segments 177. As in the other constructions, the segments 177 slidably engage the graphite disc 168.

Adjacent their outer edges, the levers 172 support a cylindrical sleeve 181 located adjacent the casing 162. The sleeve 181 extends upwardly and at its upper end supports a disc member 182 which in turn supports a disc 183 and a plurality of segments 184 which may be similar to the members 176 and 177, respectively.

A plurality of pins 186 preferably interconnect the members 163, 171, 172 and 176 and prevent rotative movement of the latter three members. Similarly, a plurality of pins 187 interconnect members 182 and 183 to prevent rotative movement of the latter member. Rotation of the segments 177 and 184 is prevented by the projection-recess construction.

FIG. 10 shows a modification wherein the ring 171 is eliminated. The support 163 is formed with an inwardly extending portion 188 having an upwardly extending, rounded flange 189 which supports the levers 172. The need for the projections 173 on the levers 172 is also eliminated by this construction.

From the foregoing it can be seen that the persent invention provides a novel bearing assembly which has a large thrust capacity, yet is relatively small in diameter and compact. Thus, an assembly according to this invention is well suited for use with a submersible pump-motor unit, and the like, in which large thrust loads can be expected.

I claim:

1. A thrust bearing assembly for use with a rotatable thrust imposing member and a non-rotatable support member, comprising a plurality of thrust bearing units, each of said units comprising a rotatable element and a non-rotatable element, said rotatable element of each of said units being connectable with said rotatable member for rotation therewith, and said non-rotatable element of each of said units being connectable with said non-rotatable member, balancing means for dividing a thrust into portions of predetermined relationship and for distributing said portions among said units, said balancing means being connected with one of said elements of each of said units and being connectable with one of said members to thereby connect said one element of each of said units to said one member, and self-leveling means connected with the other of said elements of each of said units and being connectable with the other of said members to thereby connect said other element of each of said units to said other member.

2. An assembly according to claim 1 in which said units are arranged in vertically stacked relation.

3. An assembly according to claim 1, in which said units are of the Kinsbury type, the elements of each unit being generally flat and annular, and one of said elements including a plurality of circumferentially arranged segments which slidably engage the other of said elements.

4. An assembly according to claim 1, in which said balancing means comprises means for dividing the thrust into a first portion and a remaining portion, and thrust transmitting means, said dividing means engaging said one element of one unit for applying said first portion of the thrust thereto and also engaging said thrust transmitting means for applying said remaining portion thereto, said thrust transmitting means being connected with said one element of all remaining units to transmit said remaining portion of the thrust thereto.

5. An assembly according to claim 4, in which said dividing means comprises lever means having spaced portions in engagement with said one element of said one unit and said transmitting means respectively and adapted to receive such thrust intermediate said portions.

6. An assembly according to claim 5, in which said lever means comprises a plurality of circumferentially spaced radially extending levers, each lever having a pair of longitudinally spaced portions in engagement with said one element of said one unit and said transmitting means respectively.

7. A thrust bearing according to claim 4, in which said thrust transmitting means comprises an axially shiftable sleeve extending axially from said one unit to the next adjacent unit and having one end engaging said dividing means to receive said remaining portion of said thrust therefrom.

8. An assembly according to claim 1, in which said balancing means comprises at least one set of circumferentially spaced lever members, said lever members extending radially of the axis of rotation of said rotatable elements, each lever member being formed to receive a thrust at one point and to transmit that thrust from two longitudinally spaced points on opposite sides of said one point.

9. An assembly according to claim 8, in which the location of said one point with respect to said two points is a function of the number of thrust bearing units in said assembly.

10. An assembly according to claim 8, in which said balancing means includes an axially extending sleeve having one end in engagement with said set of lever members, said sleeve being axially shiftable relative to said units.

11. A thrust bearing assembly, comprising a thrust plate adapted to be secured to a rotatable shaft member for receiving a thrust from such shaft member, a first thrust bearing unit, a second thrust bearing unit, each of said units including a rotatable element and a non-rotatable element, a set of lever members disposed between said thrust plate and said first unit, said lever members being circumferentially spaced and extending generally radially with their outer ends in engagement with the rotatable element of said first thrust bearing unit, a sleeve having one end supporting the inner ends of said lever members and its other end supported by the rotatable element of said second unit, and a support member supporting the non-rotatable elements of both of said units and holding said non-rotatable elements against rotation, said support member providing leveling means for each of said non-rotatable elements, said thrust plate engaging said lever members intermediate their ends.

12. An assembly according to claim 11, in which said thrust plate is a disk having an axially projecting concentric flange for engaging said lever members.

13. A thrust bearing assembly for a rotatable shaft member comprising a plurality of axially spaced thrust bearing units each including a rotatable element and a non-rotatable element, a thrust plate for each of said units except the last, said thrust plates being adapted to be mounted on said rotatable shaft member for rotation with the shaft and operable to transmit certain portions of thrust to their associated thrust bearing units, the first of said thrust plates being adapted to be fixed to said shaft member and the remainder of said thrust plates being adapted to be axially shiftable relative to said shaft member, axially shiftable means adapted to be disposed around such shaft member for transmitting portions of such thrust from each unit to the next, lever means for connecting said thrust plates to said shiftable means and to one element of each of said units except the last, and means for supporting and leveling the other elements of all of said units.

14. An assembly according to claim 13, in which said shiftable means and said supporting and leveling means are concentric inner and outer sleeve structures.

15. An assembly according to claim 14, in which said inner sleeve structure is concentrically located inside all of said bearing units except the last, and said outer sleeve structure is concentrically located outside all of said units except the first.

16. An assembly according to claim 14, in which said outer sleeve structure is provided with pivot means for each of said other elements, said pivot means cooperating with said other elements to provide independent leveling for each of said other elements.

17. A thrust bearing assembly, comprising a thrust plate adapted to be secured to a rotatable shaft member for receiving a thrust from such shaft member, a first thrust bearing unit, a second thrust bearing unit, each of said units including a rotatable element and a non-rotatable element, a set of lever members disposed between said thrust plate and said first unit, said lever members being circumferentially spaced and extending generally radially with their outer ends in engagement with the rotatable element of said first thrust bearing unit, a sleeve having one end bearing directly against and supporting the inner ends of said lever members and its other end bearing directly against and supported by a rotatable element of said second unit, and a support member supporting the non-rotatable elements of both of said units and holding said non-rotatable elements against rotation, said support member providing leveling means for each of said non-rotatable elements, said thrust plate engaging said lever members intermediate their ends.

18. A thrust bearing assembly, comprising a thrust plate adapted to be secured to a rotatable shaft member for receiving a thrust from such shaft member, a first thrust bearing unit, a second thrust bearing unit, each of said units including a rotatable element and a non-rotatable element, a set of lever members disposed between said thrust plate and said first unit, said lever members being circumferentially spaced and extending generally radially with their outer ends in engagement with the rotatable element of said first thrust bearing unit, a sleeve having one end supporting the inner ends of said lever members and its other end supported by the rotatable element of said second unit, a support member supporting the non-rotatable elements of both of said units and holding said non-rotatable elements against rotation, said support member providing leveling means for each of said non-rotatable elements, said thrust plate engaging said lever members intermediate their ends, and a second thrust transfer plate for said second unit, said other end of said sleeve bearing against said second thrust transfer plate.

19. A thrust bearing assembly for use with a rotatable thrust imposing member and a non-rotatable support member, comprising two thrust bearing units, each of said units comprising a rotatable element and a non-rotatable element, said rotatable element of each of said units being connectable with said rotatable member for rotation therewith, and said non-rotatable element of each of said units being connectable with said non-rotatable member, means for dividing and distributing a thrust from said thrust imposing member among said units, said dividing and distributing means being connected with one of said elements of each of said units and being connectable with one of said members to thereby connect said one element of each of said units to said one member, said dividing and said distributing means comprising at least one set of circumferentially spaced lever members, said lever members extending radially of the axis of rotation of said rotatable elements, each lever member being formed to receive a thrust at one point and to transmit that thrust from two longitudinally spaced points on opposite sides of said one point, said one point being located midway between said two points, and self-leveling means connected with the other of said elements of each of said units and being connectable with the other of said members to thereby connect said other element of each of said units to said other member.

20. A thrust bearing assembly for use with a rotatable thrust imposing member and a non-rotatable support member, comprising three thrust bearing units, each of said units comprising a rotatable element and a non-rotatable element, said rotatable element of each of said units being connectable with said rotatable member for rotation therewith, and said non-rotatable element of each of said units being connectable with said non-rotatable member, means for dividing and distributing a thrust from said thrust imposing member among said units, said dividing and distributing means being connected with one of said elements of each of said units and being connectable with one of said members to thereby connect said one element of each of said units to said one member, said dividing and distributing means comprising two sets of circumferentially spaced lever members, said lever members extending radially of the axis of rotation of said rotatable elements, each lever member being formed to receive a thrust at one point and to transmit that thrust from two longitudinally spaced points on opposite sides of said one point, said one point for the levers of one of said sets being located nearer to one of said two points than the other of said two points, and self-leveling means connected with the other of said elements of each of said units and being connectable with the other of said members to thereby connect said other element of each of said units to said other member.

21. A thrust bearing assembly for use with a rotatable thrust imposing member and a non-rotatable support member, comprising a plurality of thrust bearing units, each of said units comprising a rotatable element and a non-rotatable element, said rotatable element of each of said units being connectable with said rotatable member for rotation therewith, and said non-rotatable element of each of said units being connectable with said non-rotatable member, balancing means for dividing a thrust from said thrust imposing member into portions of predetermined relationship and for distributing said portions among said units, said balancing means being connected with said rotatable element of each of said units and being connectable with said rotatable member to thereby connect said rotatable elements to said rotatable member, and self-leveling means connected with said non-rotatable element of each of said units and being connectable with said support member to thereby connect said non-rotatable elements to said non-rotatable member.

22. A thrust bearing assembly for use with a rotatable thrust imposing member and a non-rotatable support member, comprising a plurality of thrust bearing units, each of said units comprising a rotatable element and a non-rotatable element, said rotatable element of each of said units being connectable with said rotatable member for rotation therewith, and said non-rotatable element of each of said units being connectable with said non-rotatable member, means for dividing and distributing a thrust from said thrust imposing member among said units, said dividing and distributing means being connected with one of said elements of each of said units and being connectable with one of said members to thereby connect said one element of each of said units to said one member, and self-leveling means connected with the other of said elements of each of said units and being connectable with the other of said members to thereby connect said other element of each of said units to said other member, said dividing and distributing means comprising at least one set of circumferentially spaced lever members, said lever members extending radially of the axis of rotation of said rotatable elements, each lever member being formed to receive a thrust at one point and to transmit that thrust from two longitudinally spaced points on opposite sides of said one point, and an axially extending sleeve having one end in engagement with all of said lever members of said set at their inner ends, said sleeve being axially shiftable relative to said units.

References Cited

UNITED STATES PATENTS

| 1,421,082 | 6/1962 | Hall | 308—160 |
| 3,183,048 | 5/1965 | Komor | 308—160 |

FOREIGN PATENTS

| 274,401 | 5/1914 | Germany. |

MARTIN P. SCHWADRON, *Primary Examiner.*

FRANK SUSKO, *Examiner.*